(12) United States Patent  
Cerda et al.

(10) Patent No.: US 9,301,335 B1
(45) Date of Patent: Mar. 29, 2016

(54) METHOD AND SYSTEM FOR USING A PROXY DEVICE TO THROTTLE COMMUNICATIONS BETWEEN A TETHERED DEVICE AND A NETWORK

(71) Applicant: Sprint Spectrum L.P., Overland Park, KS (US)

(72) Inventors: Sal Cerda, Peculiar, MO (US); Stephen D. Williams, Olathe, KS (US); Christopher D. Schmitt, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 264 days.

(21) Appl. No.: 13/955,559

(22) Filed: Jul. 31, 2013

(51) Int. Cl.
*H04L 12/54* (2013.01)
*H04W 88/04* (2009.01)

(52) U.S. Cl.
CPC ..................................... *H04W 88/04* (2013.01)

(58) Field of Classification Search
CPC .................................................... H04W 88/04
See application file for complete search history.

(56) References Cited

U.S. PATENT DOCUMENTS

| | | | | |
|---|---|---|---|---|
| 7,095,754 | B2* | 8/2006 | Benveniste | 370/465 |
| 8,249,141 | B1* | 8/2012 | Harris et al. | 375/240.01 |
| 8,526,976 | B1* | 9/2013 | Vargantwar et al. | 455/458 |
| 8,750,849 | B1* | 6/2014 | Adib et al. | 455/417 |
| 8,913,494 | B1* | 12/2014 | Marupaduga et al. | 370/230 |
| 8,929,852 | B1* | 1/2015 | Singh et al. | 455/404.1 |
| 8,948,085 | B2* | 2/2015 | Barbieri et al. | 370/328 |
| 2005/0141596 | A1* | 6/2005 | Black | H04B 1/715 375/133 |
| 2008/0020779 | A1* | 1/2008 | Ode et al. | 455/450 |
| 2009/0175186 | A1* | 7/2009 | Du et al. | 370/252 |
| 2009/0280851 | A1* | 11/2009 | Dostal et al. | 455/518 |
| 2010/0062770 | A1* | 3/2010 | Flynn | H04W 88/04 455/436 |
| 2010/0238854 | A1* | 9/2010 | Kazmi | H04B 7/155 370/315 |
| 2013/0337771 | A1* | 12/2013 | Klein et al. | 455/411 |
| 2014/0204847 | A1* | 7/2014 | Belleschi | H04W 76/023 370/329 |

* cited by examiner

*Primary Examiner* — Kevin Mew

(57) ABSTRACT

A method and system for managing the allocation of uplink transmission resources. A first subscriber device may communicate with a second subscriber device over a local communication link. The first subscriber device may also transmit data over an air interface to a radio access network (RAN) serving the first subscriber device, with the first subscriber device serving as a proxy between the second subscriber device and the RAN. In response to the data including first data originated by the first subscriber device and second data originated by the second subscriber device that is received by the first subscriber device from the second subscriber device over the local communication link, the first subscriber device may be arranged to apply a different transmission priority for the transmitting of the first data over the air interface than for the transmitting of the second data over the air interface.

19 Claims, 3 Drawing Sheets

METHOD AND SYSTEM FOR USING A PROXY DEVICE TO THROTTLE COMMUNICATIONS BETWEEN A TETHERED DEVICE AND A NETWORK

BACKGROUND

Unless otherwise indicated herein, the materials described in this section are not prior art to the claims and are not admitted to be prior art by inclusion in this section.

To provide cellular wireless communication service, a wireless service provider or "wireless carrier" typically operates a radio access network (RAN) that defines one or more coverage areas in which devices that are subscribed to service from the wireless carrier, such as wireless communication devices (WCDs), can be served by the RAN and can thereby obtain connectivity to broader networks such as the public switched telephone network (PSTN) and the Internet. A typical RAN may include one or more base stations (e.g., macro network cell towers and/or femtocells, such as base transceiver stations (BTS), access nodes, node-Bs, eNodeBs (eNB), or the like), each of which may radiate to define the coverage areas in which WCDs can operate. Further, each coverage area may operate on one or more radio carrier frequencies (e.g., radio frequency radiation patterns from a respective base station antenna). The base stations may then be coupled with a controller, which may then be coupled (e.g., directly or indirectly) with a switch or gateway that provides connectivity with a transport network such as the PSTN or the Internet. When a WCD, such as a cellular telephone, pager, or wirelessly-equipped computer, is positioned in a coverage area, the WCD communicates via a radio frequency air interface with the base station antennae of the coverage area. Consequently, a communication path can be established between the WCD and the transport network, via the air interface, the base station, the controller, and the switch or gateway.

In general, a cellular wireless system may operate in accordance with a particular air interface protocol or "radio access technology." Examples of existing air interface protocols include Code Division Multiple Access (CDMA) (e.g., IS-95, IS-2000, 1xRTT, 1xEV-DO, etc.), Long-Term Evolution (LTE) (e.g., FDD LTE and TDD LTE), WiMax (e.g., IEEE 802.16), iDEN, TDMA, AMPS, GSM, GPRS, UMTS, EDGE, MMDS, Wi-Fi (e.g., IEEE 802.11), and Bluetooth. Each protocol may define its own procedures for initiation of calls, handoff between coverage areas, and functions related to air interface communication.

In accordance with the air interface protocol, each coverage area may operate on one or more carrier frequencies and may define a number of air interface channels for carrying information between the base station and served WCDs. These channels may be defined in various ways, such as through frequency division multiplexing, time division multiplexing, and/or code-division multiplexing (e.g., spread-spectrum modulation), for instance.

By way of example, each coverage area may define a downlink (or "forward-link") control channel or other resource on which a base station may transmit control messages such as system information messages or page messages to WCDs. Each coverage area may also define an uplink (or "reverse-link") control channel or other resource on which WCDs may transmit control messages such as registration requests and call origination requests (e.g., voice calls, data sessions, and/or other "calls") to the base station. Each coverage area may then define one or more traffic channels (e.g., on the downlink) for carrying communication traffic such as voice data or other data between the base station and the WCD. In some examples, these links may be defined on one or more carrier frequencies or blocks of frequencies (e.g., frequency bands, such as 698-960 MHz, 1610-2025 MHz, etc.).

When the WCD seeks to engage in packet data communication with the RAN, the RAN (e.g., the WCD's serving base station) may assign one or more traffic channels or other connections for use by the WCD so as to enable the WCD to negotiate with the RAN and establish an active data connection. Once the WCD has established the active data connection, the WCD may then engage in a data communication session with the RAN. Types of data communication sessions may include, for instance, voice over Internet Protocol (VOIP) calls (e.g., push to-talk (PTT) and push-to-view (PTV) communication), file transfer protocol (FTP) sessions, and web browsing sessions, among others.

OVERVIEW

When a first device, such as a first WCD, is subscribed to a wireless carrier and being served by a RAN operated by the wireless carrier, it may engage in a data communication session with the RAN. A second device, such as a second WCD, may also be subscribed to the wireless carrier and may seek to engage in a data communication session with the RAN as well, but for one reason or another, it may not be able to transmit its data to the RAN. For instance, although the first WCD may have adequate signal strength from the RAN, the second WCD may not. However, the second WCD may be nearby the first WCD, and may negotiate with the first WCD to establish a connection with the first WCD over a local communication link. Once the second WCD establishes the connection with the first WCD over the local communication link, it can then engage in communication with the RAN through the first WCD, with the first WCD serving as a proxy between the second WCD and the RAN. The second WCD may then be able to transmit its data to the RAN via the first WCD.

In practice, when the first WCD is engaged in a data communication session with the RAN, it can generate and store its own data in a buffer for output to the RAN. Further, when the first WCD has a connection with the second WCD over a local communication link, the first WCD can receive data generated by the second WCD over the local communication link and store the received data in a buffer for output to the RAN. As such, the first WCD may be arranged to store its own generated data along with the data generated by the second WCD in a first buffer and a second buffer, respectively.

Given this arrangement, when the first WCD is serving as a proxy between the second WCD and the RAN, the first WCD may be arranged to transmit its own generated data to the RAN from the first buffer, but may also be arranged to transmit the data generated by the second WCD to the RAN from the second buffer. To facilitate this, the air interface between the first WCD and the RAN may define resources for transmission of data on the uplink (e.g., time slots) that the first WCD can use to transmit its own generated data and the data generated by the second WCD. Therefore, the first WCD may need to allocate those resources among its own generated data and the data generated by the second WCD. Accordingly, disclosed herein is a method and corresponding system for managing the allocation of those resources. In accordance with the disclosure, a first subscriber device (e.g., a first WCD) may manage those resources by applying a different transmission priority for data that it generates itself than for data that it receives from a second subscriber device (e.g., a second WCD).

In one respect, the method includes the first subscriber device communicating with a second subscriber device over a local communication link. The method further includes the first subscriber device transmitting data over an air interface to a RAN serving the first subscriber device, the data including first data originated by the first subscriber device and second data originated by the second subscriber device and received by the first subscriber device from the second subscriber device over the local communication link. The method still further includes, responsive to the first data being originated by the first subscriber device and the second data being originated by the second subscriber device and being received by the first subscriber device, the first subscriber device applying a different transmission priority for the transmitting of the first data over the air interface than for the transmitting of the second data over the air interface.

In another respect, disclosed is a non-transitory computer-readable medium having stored thereon program instructions executable by a first WCD to cause the first WCD to perform functions. The functions include originating first data for transmission from the first WCD over an air interface to a RAN serving the first WCD. The functions further include receiving over a peer-to-peer local wireless communication link from a second WCD second data for transmission from the first WCD over the air interface to the RAN. And the functions still further include, responsive to the first data being originated by the first WCD and the second data being received from the second WCD, giving higher transmission priority to transmission of the first data over the air interface to the RAN than to transmission of the second data over the air interface to the RAN.

In yet another respect, disclosed is a first subscriber device that includes a first communication module for engaging in communication with a RAN, a second communication module for engaging in communication with a second subscriber device, at least one processor, a data storage, and program instructions stored in the data storage executable by the at least one processor to cause the first subscriber device to perform functions. The functions include communicating with the second subscriber device over a peer-to-peer local communication link. The functions further include transmitting data over an air interface to the RAN serving the first subscriber device, the data including first data originated by the first subscriber device and second data originated by the second subscriber device and received by the first subscriber device from the second subscriber device over the peer-to-peer local communication link. The functions still further include, responsive to the first data being originated by the first subscriber device and the second data being originated by the second subscriber device and being received by the first subscriber device, applying a different transmission priority for the transmitting of the first data over the air interface than for the transmitting of the second data over the air interface.

This overview is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

I. Introduction

The present method and system will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

II. Example Communication System

Figure 1:
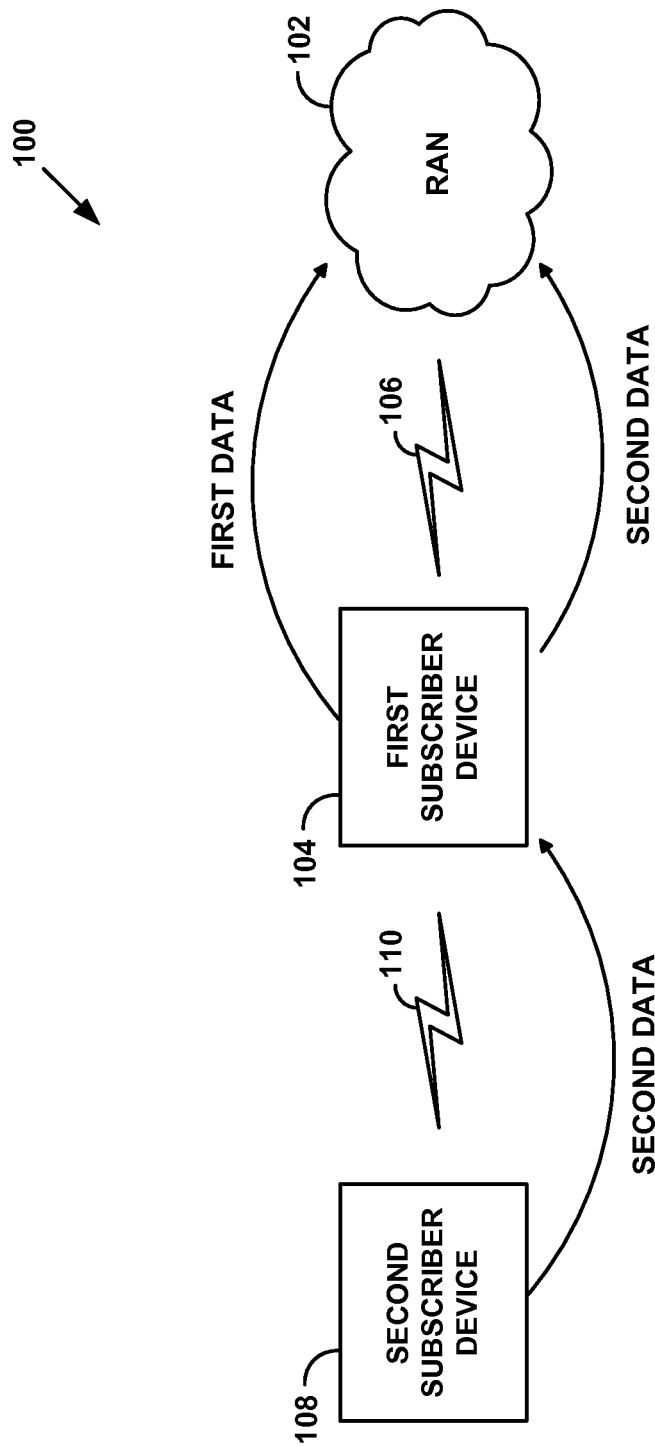
FIG. 1 is a simplified block diagram of an example communication system in which the present methods can be implemented.

FIG. 1 is a simplified block diagram of an example communication system 100, which includes a RAN 102 operated by a wireless carrier and serving a first subscriber device 104 (e.g., a WCD). The RAN 102 may facilitate communication between the RAN 102 and the first subscriber device 104 via a base station (e.g., base transceiver stations (BTS), access nodes, node-Bs, eNodeBs (eNB), or the like) and/or other RAN entities over an air interface 106. However, it should be understood that, in other systems, the first subscriber device 104 may communicate with the RAN 102 over a wired connection or other type of connection rather than or in addition to over an air interface.

In order for the RAN 102 to facilitate communication with the first subscriber device 104 over the air interface 106, it may provide service under an air interface protocol, such as one of those noted above (e.g., CDMA, LTE, WiMax, etc.). In some systems, however, it is possible that the wireless carrier may provide service under more than one protocol. Each air interface protocol may define its own procedures and parameters related to air interface communication.

The air interface 106 may define resources for uplink transmission between the first subscriber device 104 and the RAN 102. Those resources may be defined in accordance with the air interface protocol being used by the RAN 102. Further, the RAN 102 may provide the resources to the first subscriber device 104 in order to facilitate a communication of information from the first subscriber device 104 to the RAN 102 over the air interface 106.

In line with the discussion above, the air interface 106 may define, for example, a periodically recurring sequence of time units (or "time slots") for carrying information from the first subscriber device 104 to the RAN 102. When the first subscriber device 104 engages in a data communication session with the RAN 102, for instance, it may be arranged to transmit data to the RAN 102 in those time units. As another example, when the air interface 106 is an LTE air interface or other Orthogonal Frequency Division Multiple Access (OFDMA) air interface, it may define a plurality of OFDMA resource blocks for carrying information from the first subscriber device 104 to the RAN 102. When the first subscriber device 104 engages in a data communication session with the RAN 102, for instance, it may be arranged to transmit data to the RAN 102 in those resource blocks.

The system 100 shown in FIG. 1 also includes a second subscriber device 108 (e.g., another WCD) that is nearby the first subscriber device 104. In practice, the first subscriber device 104 may communicate with the second subscriber device 108 over a local communication link 110, which can take a variety of forms. By way of example, the local communication link 110 can be a wireless local communication link (e.g., Bluetooth, WiFi, etc.). Alternatively, the local communication link 110 may comprise a wired or optical communication link, such as a wired or optical cable. Further, the link may comprise a Universal Serial Bus (USB). Still further, the local communication link 110 may comprise one or more intermediate entities and links. For instance, the first subscriber device 104 could communicate locally with an intermediate router, switch, proxy, or other entity, which may in turn communicate with the second subscriber device 108, such as over a local area network (LAN) or a personal area network (PAN). Yet still further, any of the variety of forms noted above may exist in a peer-to-peer network. Other arrangements of the local communication link are possible as well.

In practice, when the first subscriber device 104 is engaged in a data communication session with the RAN 102, the first subscriber device 104 may be arranged to originate its own data and communicate that data to the RAN 102. And, when the first subscriber device 104 has an established connection with the second subscriber device 108, such as the local communication link 110, the first subscriber device 104 may also be arranged to receive over the local communication link 110 data originated at the second subscriber device 108. It should be understood that the data originated at the first subscriber device 104 is data that has not been generated by or originated at the second subscriber device.

Figure 2:
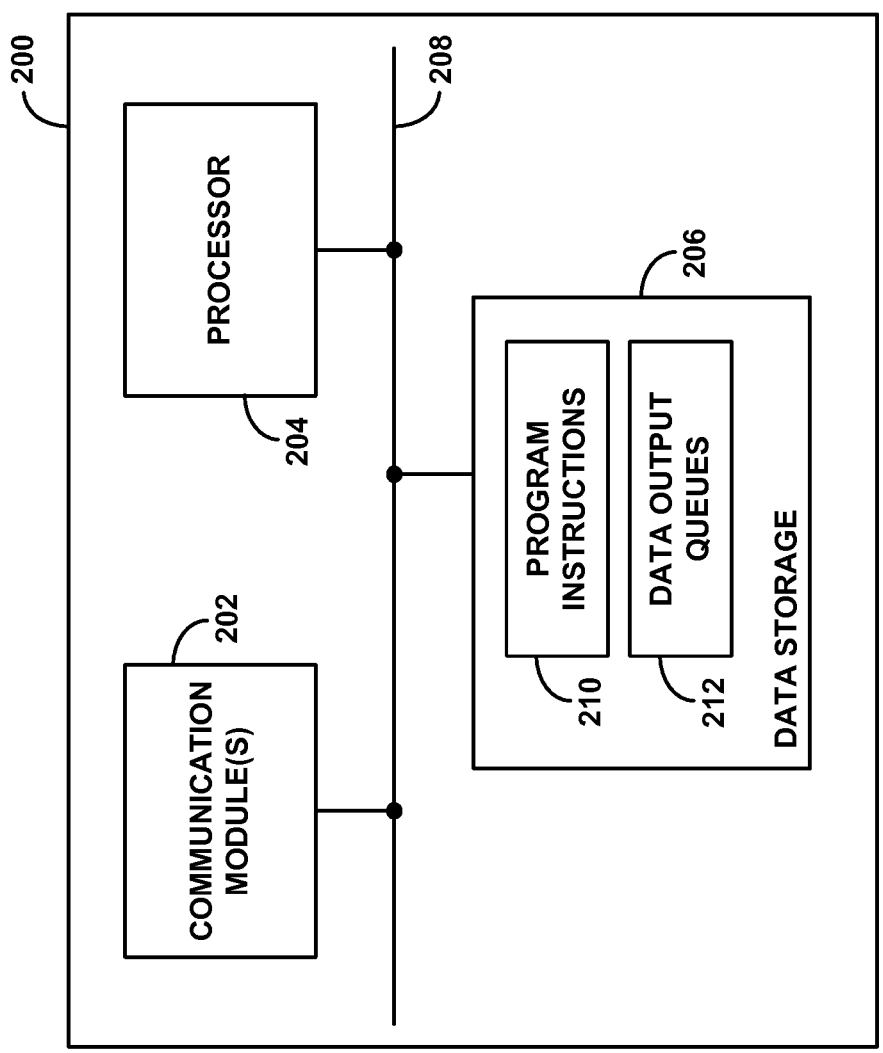
FIG. 2 is a simplified block diagram of an example first subscriber device arranged to operate in the example communication system in accordance with the present method.

FIG. 2 is a simplified block diagram of an example subscriber device 200 that is arranged to operate in the system 100 shown in FIG. 1 (e.g., the first subscriber device 104). As shown, the example subscriber device 200 includes one or more communication modules 202, a processor 204, and a non-transitory data storage 206, all of which may be communicatively linked together by a system bus, network, or other connection mechanism 208. Variations from this arrangement are of course possible as well, including addition and omission of components, combination of components, and distribution of components in any of a variety of ways. For example, in some arrangements, the processor 204 and data storage 206 may be included as part of a control module of the example subscriber device 200, which may function to perform one or more of the functions described herein.

The communication module(s) 202 may include a first communication module, which may function to engage in air interface communication with base stations of the RAN (e.g., BTSs and eNBs). For example, with respect to FIG. 1, the first communication module may function to engage in communication with the RAN 102 over air interface 106. As such, the first communication module may include an antenna structure and a chipset arranged to support communication according to one or more air interface protocols, such as those discussed above, for instance.

The communication module(s) 202 may also include a second communication module, which may function to engage in communications with another subscriber device or other device. For example, with respect to FIG. 1, the second communication module may function to engage in communication with the second subscriber device 108. As such, the second communication module may include an antenna structure, chipset, USB port, and/or other components arranged to support communication with the second subscriber device 108. As noted above, such communication may take place over a local communication link, such as a wireless local communication link, a wired local communication link, or another type of local communication link. Further, it should be understood that while the first and second communication modules may be integrated together as shown, either the first or second communication module could perform the functions of both communication modules.

The processor 204 may comprise one or more general purpose processors (e.g., microprocessors) and/or one or more special purpose processors (e.g., application specific integrated circuits or the like) and may be integrated in whole or in part with the communication module(s) 202. The non-transitory data storage 206 may then comprise one or more volatile and/or non-volatile storage components, particularly non-transitory storage, such as magnetic, optical, or flash memory for instance, and may be integrated in whole or in part with the processor 204. Additionally or alternatively, the non-transitory data storage 206 may be provided separately, as a non-transitory machine readable medium. As shown, the non-transitory data storage 206 may hold (e.g., contain, store, or be encoded with) program instructions 210 (e.g., machine language instructions or other program logic, markup or the like) executable by the processor to carry out various functions described herein.

The non-transitory data storage 206 may also hold or define data output queues 212 (e.g., buffers). By way of example, with respect to FIG. 1, the data output queues 212 held in the first subscriber device 104 may include a first output queue and a second output queue. The first subscriber device 104 may be arranged to store in the first output queue data originated by the first subscriber device 104. Further, the first subscriber device 104 may also be arranged to store in the second output queue data originated at the second subscriber device 108 and received over the local communication link 110 by the first subscriber device 104. As such, the first subscriber device 104 may be arranged to transmit from the first output queue the data originated at the first subscriber device 104 and transmit from the second output queue the data originated at the second subscriber device 108.

Given the arrangement just described with respect to FIG. 1 and FIG. 2, the first subscriber device 104 may engage in a data communication session with the RAN 102 over the air interface 106, and the second subscriber device 108 may then engage in a data communication session with the RAN 102 via the first subscriber device 104, with the first subscriber device 104 serving as a proxy to facilitate communication between the second subscriber device 108 and the RAN 102. To facilitate this, the first subscriber device 104 may be arranged to transmit the data originated at the first subscriber device 104 and the data originated at the second subscriber device 108 using resources for uplink transmission defined by the air interface 106.

Further, in line with the discussion above, the air interface 106 may have a particular bandwidth that is divided into time units, resource blocks, or other resources spanning the bandwidth (i.e., as many as would fit in the particular bandwidth). However, the particular bandwidth that is provided by the RAN 102 to the first subscriber device 104 may be limited in scope. Given this limitation, the first subscriber device 104 may have limited resources on which to transmit data to the RAN 102 over the air interface 106. As such, when the first subscriber device 104 is arranged to transmit its own originated data as well as arranged to transmit data originated at the second subscriber device 108, the first subscriber device 104 may need to manage the limited resources accordingly. The present method helps to address this need.

III. Example Operation

Figure 3:
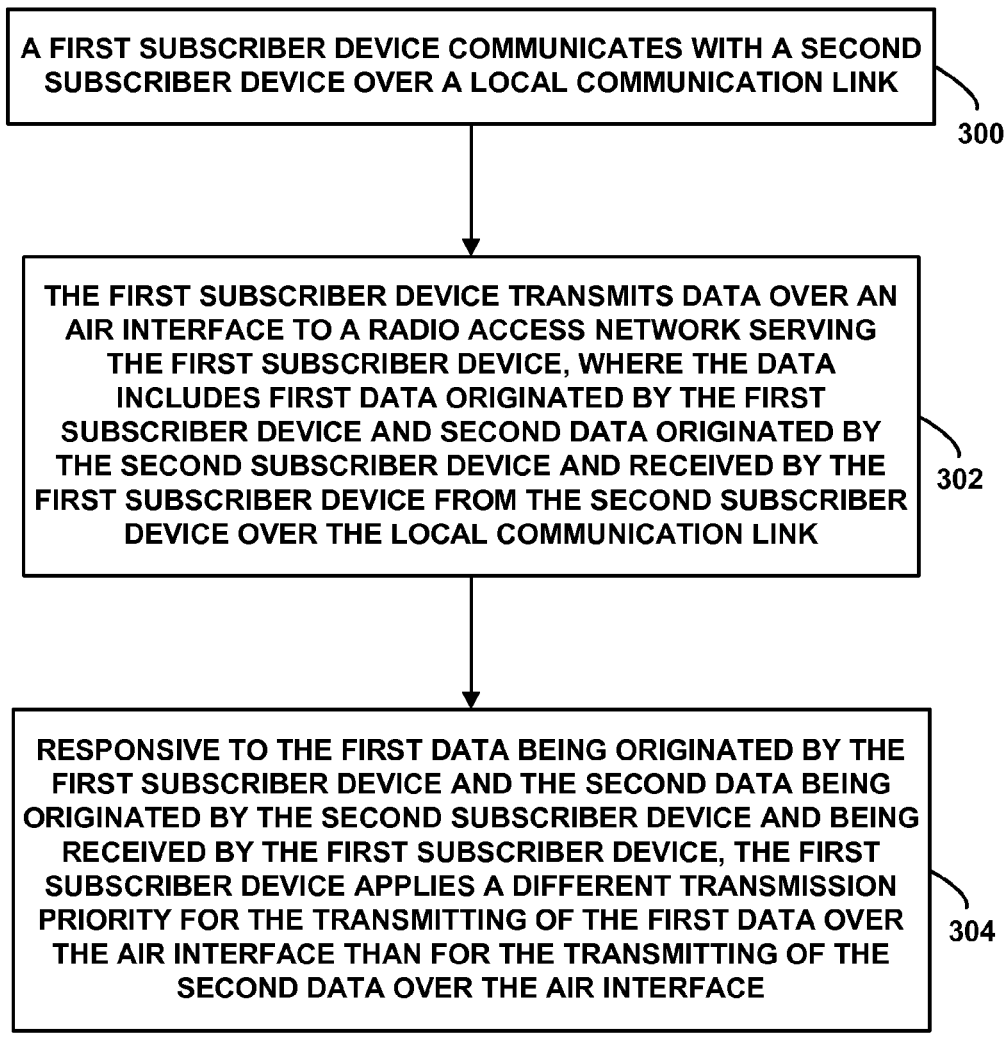
FIG. 3 is a flow chart depicting functions that can be carried out in accordance with the present methods.

FIG. 3 is a flow chart depicting functions that can be carried out in accordance with the present method. For the sake of example, the present method will be assumed to be carried out by the first subscriber device 104 in the network arrangement of FIG. 1 in which the first subscriber device 104 is served by RAN 102 and functions as a proxy for the second subscriber device 108. It should be understood, however, that in other examples, the present method may also be carried out with respect to other network arrangements and other devices. The present method may include one or more operations, functions, or actions as illustrated by one or more of blocks 300-304. Although the blocks are illustrated in a sequential order, the functions illustrated by the blocks may also be performed in parallel, and/or in another order different than those described herein.

At block 300, the present method involves the first subscriber device communicating with the second subscriber device over a local communication link. The local communication link may be a wired and/or wireless local communication link, as noted above. Further, in some scenarios, the communication between the first and second subscriber devices may occur while the first subscriber device is engaged in a data communication session with the RAN.

At block 302, the present method involves the first subscriber device transmitting data over an air interface to the RAN serving the first subscriber device. Further, the data may include first data originated by the first subscriber device. Still further, the data may include second data originated by the second subscriber device and received by the first subscriber device from the second subscriber device over the local communication link.

When the first subscriber device has the first and second data buffered for transmission to the RAN, or in real time as the first subscriber device originates its own data and receives data from the second subscriber device (regardless of buffering), the first subscriber device may be arranged to determine when to transmit the first data and how much of the first data to transmit. The first subscriber device may also be arranged to determine when to transmit the second data and how much of the second data to transmit. Namely, the first subscriber device may be arranged to determine a transmission priority for transmitting the first data and a transmission priority for transmitting the second data.

The transmission priority for transmitting the first data may be equal to the transmission priority for transmitting the second data. For example, the first subscriber device may transmit equal amounts of the first and second data. Further, the first subscriber device may transmit the first and second data at the same time.

On the other hand, the transmission priority for transmitting the first data may be different than the transmission priority for transmitting the second data. For example, the first subscriber device may transmit the first data before transmitting the second data, or vice versa. Further, the first subscriber device may transmit the first data at a higher rate than the second data, or vice versa.

In line with the discussion above, at block 304, the present method then involves, responsive to the first data being originated by the first subscriber device and the second data being originated by the second subscriber device and being received by the first subscriber device, the first subscriber device applying a different transmission priority for the transmitting of the first data over the air interface than for the transmitting of the second data over the air interface.

Details of this method may take various forms. By way of example, as noted above, the first subscriber device applying different transmission priorities to the first and second data may involve the first subscriber device transmitting the first data before transmitting the second data, or vice versa. For instance, the first subscriber device may transmit some or all of the first data from the first output queue before transmitting some or all of the second data from the second output queue, which can be considered an example of the first subscriber device applying a "higher" transmission priority for transmitting the first data than for transmitting the second data.

As another example, the first subscriber device applying different transmission priorities may involve the first subscriber device transmitting more of the first data per unit time than the second data per unit time, or vice versa. For instance, the air interface may define a periodically recurring sequence of time units for carrying data to the RAN, and the first subscriber device may be arranged to transmit data to the RAN in those time units, as described above. As such, the first subscriber device applying different transmission priorities to the first and second data may involve the first subscriber device using a different quantity of the time units for transmitting the first data than for transmitting the second data (e.g., the first subscriber device may apply a higher transmission priority for transmitting the first data than for transmitting the second data by using a higher quantity of the time units for transmitting the first data than for transmitting the second data).

As still another example, the air interface may define a plurality of OFDMA resource blocks for carrying data from the first subscriber device to the RAN (perhaps assigned by the RAN for use by the first subscriber device), and the first subscriber device may be arranged to transmit data to the RAN in those resource blocks, as described above. As such, the first subscriber device applying different transmission priorities to the first and second data may involve the first subscriber device using a different quantity of the resource blocks for transmitting the first data than for transmitting the second data. For instance, the first subscriber device may apply a higher transmission priority for transmitting the first data than for transmitting the second data by using a higher quantity of the resource blocks for transmitting the first data than for transmitting the second data.

Furthermore, the present method may also involve taking into account a type of communication service of packet data, such as real-time communication service (e.g., VOIP data, PTT data, video data, etc.) and non-real-time communication service (e.g., web browsing data, e-mail, FTP sessions, etc.), among other possible types of service. In practice, packet data may include a header portion and a data portion, and the header portion may contain a type of service (ToS) value or other indicator of the ToS. Therefore, to facilitate an identification of the ToS of the packet data, the first subscriber device may be arranged to perform deep packet inspection on the packet data that it has buffered for transmission to the RAN. Namely, the first subscriber device may identify a first ToS of the first data and a second ToS of the second data by performing deep packet inspection on the first data and the second data held in the first output queue and the second output queue.

Further, the first subscriber device may apply different transmission priorities to the first and second data responsive to the first data having a first ToS and the second data having a second ToS different than the first ToS. By way of example, it may be preferable for the first subscriber device to apply a higher transmission priority to data of a real-time communication service. Thus, if the first data is data of a real-time communication service and the second data is data of a non-real-time communication service, the first subscriber device may be arranged to apply a higher transmission priority for transmission of the first data over the air interface than for transmission of the second data over the air interface. Other examples are also possible.

Moreover, the present method may also involve taking into account a delay sensitivity of packet data, which may be similarly indicated by the header portion of the packet data. For example, as noted above, the header portion may contain a type of service (ToS) value or other indicator of the ToS, and the ToS may include real-time communication service and non-real-time communication service, among other possible types of communication service. In practice, the first subscriber device may determine that data that has real-time communication service is more delay sensitive than data that has non-real-time communication service. As another example, packet data of a Real-time Transport Protocol (RTP) data communication session (e.g., media streaming) may include RTP headers. As such, the first subscriber device may be arranged to detect a presence of an RTP header in a packet of data and consequently determine that the packet is part of a real-time data communication session and thus is delay sensitive. Further, the first subscriber device may detect an absence of an RTP header in a packet of data and consequently determine that the packet is not part of a real-time data communication session and is thus not delay sensitive.

In line with the discussion above, the first subscriber device may thus identify a delay sensitivity of the first data and a second delay sensitivity of the second data by performing deep packet inspection on the first data and the second data held in the first output queue and the second output queue. Further, the first subscriber device may apply different transmission priorities to the first and second data responsive to the first data having a delay sensitivity different than that of the second data. By way of example, it may be preferable for the first subscriber device to apply a higher transmission priority to data that is more delay sensitive, such as data transmitted as part of a real-time data communication session. Thus, if the first data has a higher delay sensitivity than the second data (i.e., the first data has real-time communication service and the second data has non-real-time communication service), the first subscriber device may be arranged to apply a higher transmission priority for transmission of the first data over the air interface than for transmission of the second data over the air interface. Other examples are also possible.

Although scenarios in which the first subscriber device applies a higher transmission priority for transmitting the first data than for transmitting the second data have been described above, it should be understood that in other scenarios, the first subscriber device may apply a higher transmission priority for transmitting the second data than for transmitting the first data. Such other scenarios may occur, for example, when the second output queue is holding more data than the first output queue. Additionally or alternatively, such other scenarios may occur when the second data has real-time communication service and the first data has non-real-time communication service. Other examples are possible as well.

While various aspects have been disclosed herein, other aspects will be apparent to those skilled in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    a first subscriber device communicating with a second subscriber device over a local communication link;
    the first subscriber device transmitting data over an air interface to a radio access network (RAN) serving the first subscriber device, the data including (i) first data originated by the first subscriber device and (ii) second data originated by the second subscriber device and received by the first subscriber device from the second subscriber device over the local communication link; and
    responsive to the first data being originated by the first subscriber device and the second data being originated by the second subscriber device and being received by the first subscriber device, the first subscriber device applying a higher transmission priority for the transmitting of the first data over the air interface than for the transmitting of the second data over the air interface.

2. The method of claim 1, wherein applying the higher transmission priority for the transmitting of the first data than for the transmitting of the second data comprises transmitting more of the first data per unit time than the second data per unit time.

3. The method of claim 2, further comprising maintaining in the first subscriber device a first output queue holding the first data and a second output queue holding the second data, and wherein transmitting more of the first data per unit time than the second data per unit time comprises outputting more data from the first output queue per unit time than from the second output queue per unit time.

4. The method of claim 1,
    wherein the air interface defines a plurality of Orthogonal Frequency Division Multiple Access (OFDMA) resource blocks allocated to carry transmissions from first subscriber device, and
    wherein applying the higher transmission priority for the transmitting of the first data than for the transmitting of the second data comprises using a higher quantity of the resource blocks for the transmitting of the first data than for the transmitting of the second data.

5. The method of claim 1,
    wherein the air interface defines a plurality of time slots allocated to carry transmissions from the first subscriber device, and
    wherein applying the higher transmission priority for the transmitting of the first data than for the transmitting of the second data comprises using a higher quantity of the time slots for the transmitting of the first data than for the transmitting of the second data.

6. The method of claim 1,
    wherein the first subscriber device has the first data buffered for transmission over the air interface to the RAN, and the first subscriber device has the second data buffered for transmission over the air interface to the RAN, and
    wherein applying the higher transmission priority for the transmitting of the first data than for the transmitting of the second data comprises transmitting the first data before transmitting the second data.

7. The method of claim 1,
    wherein the first data has a first service type and the second data has a second service type different than the first service type, and wherein applying the higher transmission priority for the transmitting of the first data than for the transmitting of the second data is further responsive to the first data having a different service type than the second data.

8. The method of claim 7, wherein the first service type is a real-time communication service, and where the second service type is a non-real-time communication service.

9. The method of claim 1, wherein the local communication link is a wireless link.

10. A non-transitory computer-readable medium having stored thereon program instructions executable by a first wireless communication device (WCD) to cause the first WCD to perform functions comprising:
    originating first data for transmission from the first WCD over an air interface to a radio access network (RAN) serving the first WCD;
    receiving over a peer-to-peer local wireless communication link from a second WCD second data for transmission from the first WCD over the air interface to the RAN; and
    responsive to the first data being originated by the first WCD and the second data being received from the second WCD, giving higher transmission priority to transmission of the first data over the air interface to the RAN than to transmission of the second data over the air interface to the RAN.

11. The non-transitory computer-readable medium of claim 10, wherein giving the higher transmission priority to the transmission of the first data over the air interface to the RAN than to the transmission of the second data over the air interface to the RAN comprises transmitting more of the first data per unit time than the second data per unit time.

12. The non-transitory computer-readable medium of claim 11, the functions further comprising maintaining in the first WCD a first output queue holding the first data and a second output queue holding the second data, and wherein transmitting more of the first data per unit time than the second data per unit time comprises outputting more data from the first output queue per unit time than from the second output queue per unit time.

13. The non-transitory computer-readable medium of claim 10,
    wherein the air interface defines a plurality of Orthogonal Frequency Division Multiple Access (OFDMA) resource blocks allocated to carry transmissions from first WCD, and
    wherein giving the higher transmission priority to the transmission of the first data over the air interface to the RAN than to the transmission of the second data over the air interface to the RAN comprises using more of the resource blocks for the transmission of the first data than for the transmission of the second data.

14. The non-transitory computer-readable medium of claim 10,
    wherein the air interface defines a plurality of time slots allocated to carry transmissions from the first WCD device, and
    wherein giving the higher transmission priority to the transmission of the first data over the air interface to the RAN than to the transmission of the second data over the air interface to the RAN comprises using more of the time slots for the transmission of the first data than for the transmission of the second data.

15. The non-transitory computer-readable medium of claim 10,
    wherein the first data has a first delay sensitivity and the second data has a second delay sensitivity different than the first delay sensitivity, and
    wherein giving the higher transmission priority to the transmission of the first data over the air interface to the RAN than to the transmission of the second data over the air interface to the RAN is further responsive to the first delay sensitivity being higher than the second delay sensitivity.

16. A first subscriber device comprising:
    a first communication module for engaging in communication with a radio access network (RAN);
    a second communication module for engaging in communication with a second subscriber device;
    at least one processor;
    a data storage; and
    program instructions stored in the data storage, wherein the program instructions are executable by the at least one processor to cause the first subscriber device to perform functions comprising:
        communicating with the second subscriber device over a peer-to-peer local communication link;
        transmitting data over an air interface to the RAN serving the first subscriber device, the data including (i) first data originated by the first subscriber device and (ii) second data originated by the second subscriber device and received by the first subscriber device from the second subscriber device over the peer-to-peer local communication link; and
        responsive to the first data being originated by the first subscriber device and the second data being originated by the second subscriber device and being received by the first subscriber device, applying a higher transmission priority for the transmitting of the first data over the air interface than for the transmitting of the second data over the air interface.

17. The first subscriber device of claim 16, wherein applying the higher transmission priority for the transmitting of the first data than for the transmitting of the second data comprises transmitting more of the second data per unit time than the first data per unit time, the functions further comprising:
    maintaining in the data storage of the first subscriber device a first output queue holding the first data and a second output queue holding the second data, and wherein transmitting more of the second data per unit time than the first data per unit time comprises outputting more data from the second output queue per unit time than from the first output queue per unit time.

18. The first subscriber device of claim 17, wherein applying the higher transmission priority for the transmitting of the first data than for the transmitting of the second data is further responsive to (i) the second output queue holding more data than the first output queue, (ii) the second data having a real-time communication service type, and (iii) the first data having a non-real-time communication service type.

19. The first subscriber device of claim 16, wherein the data is transmitted by the first subscriber device over an air interface selected from the group consisting of a Code Division Multiple Access (CDMA) air interface and a Long Term Evolution (LTE) air interface.

* * * * *